United States Patent [19]

Yamashita

[11] Patent Number: 5,148,752
[45] Date of Patent: Sep. 22, 1992

[54] PARKING GARAGE VEHICLE TURN-TABLE

[75] Inventor: Kyoichi Yamashita, Kanagawa, Japan

[73] Assignee: Koyo Jidoki Company Limited, Yokohama, Japan

[21] Appl. No.: 653,094

[22] Filed: Feb. 8, 1991

[30] Foreign Application Priority Data

Feb. 27, 1990 [JP] Japan .................................. 2-46891

[51] Int. Cl.$^5$ .............................................. B60S 13/00
[52] U.S. Cl. .................................................... 104/44
[58] Field of Search ........................ 104/44, 35, 45, 48, 104/88, 99

[56] References Cited

U.S. PATENT DOCUMENTS

| | | | |
|---|---|---|---|
| 1,749,324 | 3/1930 | Craig | 104/44 |
| 4,172,422 | 10/1979 | McBride | 104/44 |
| 4,519,493 | 5/1985 | Dyer | 104/35 |
| 4,756,660 | 7/1988 | Cesarini | 104/45 |
| 5,012,745 | 5/1991 | Yamashita . | |
| 5,037,263 | 8/1991 | Yamashita . | |

FOREIGN PATENT DOCUMENTS 2-69274 11/1990 Japan .................................. 104/44

Primary Examiner—Robert J. Oberleitner
Assistant Examiner—Mark T. Le
Attorney, Agent, or Firm—Morrison & Foerster

[57] ABSTRACT

A rotatable vehicle turn-table device for use in connection with a multi-story parking garage includes a turn-table, a circular frame and four sets of wheel fixing rollers therein which are spatially positioned to receive the wheels of a car. On opposite sides of the rollers and parallel therewith are four guard plates (inward of the rollers) and four movable side plates (outward of the rollers). Contact sensors are on the guard plates and are electrically connected to a power source. The power source can move the rollers and side plates to adjust the position of the wheels of a car on the turn-table. The wheels of the car can be moved quickly and firmly against the plates. The turn-table can be easily used by even novice drivers and can quickly and safely hold and move cars.

12 Claims, 5 Drawing Sheets

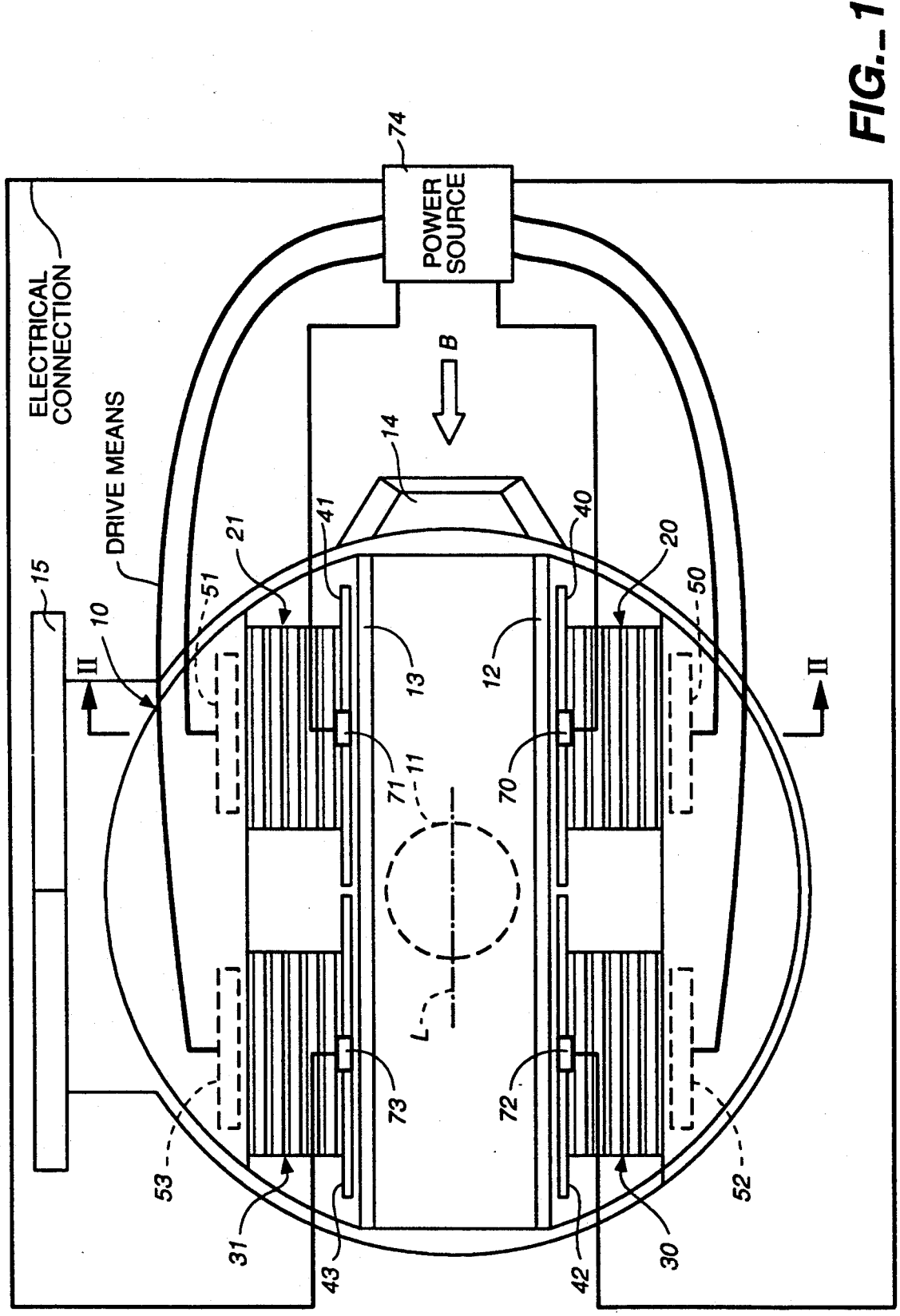
FIG._1

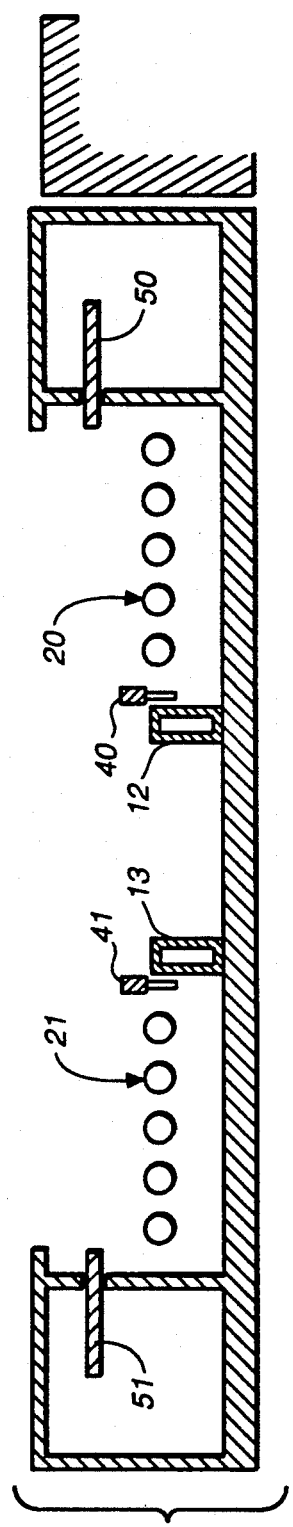
FIG._2
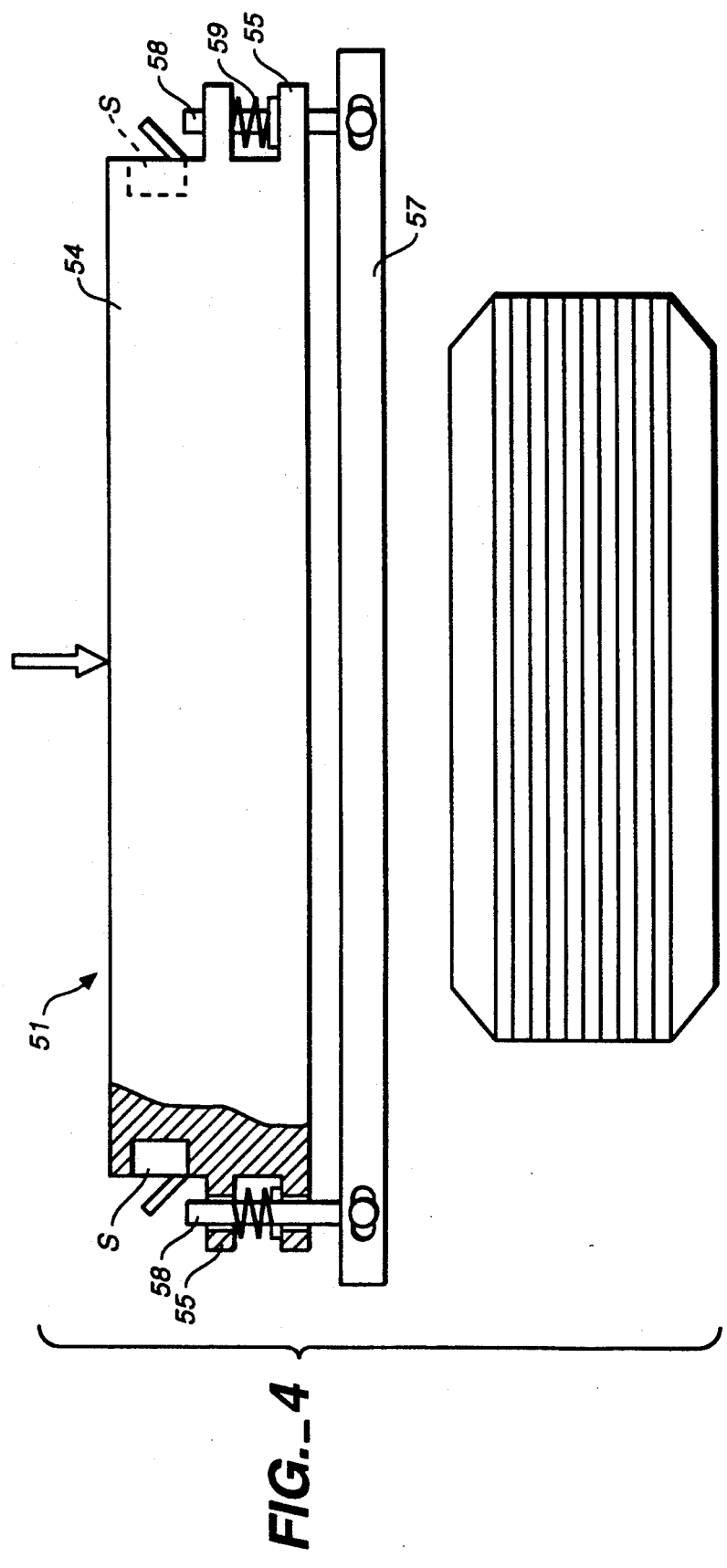
FIG._4

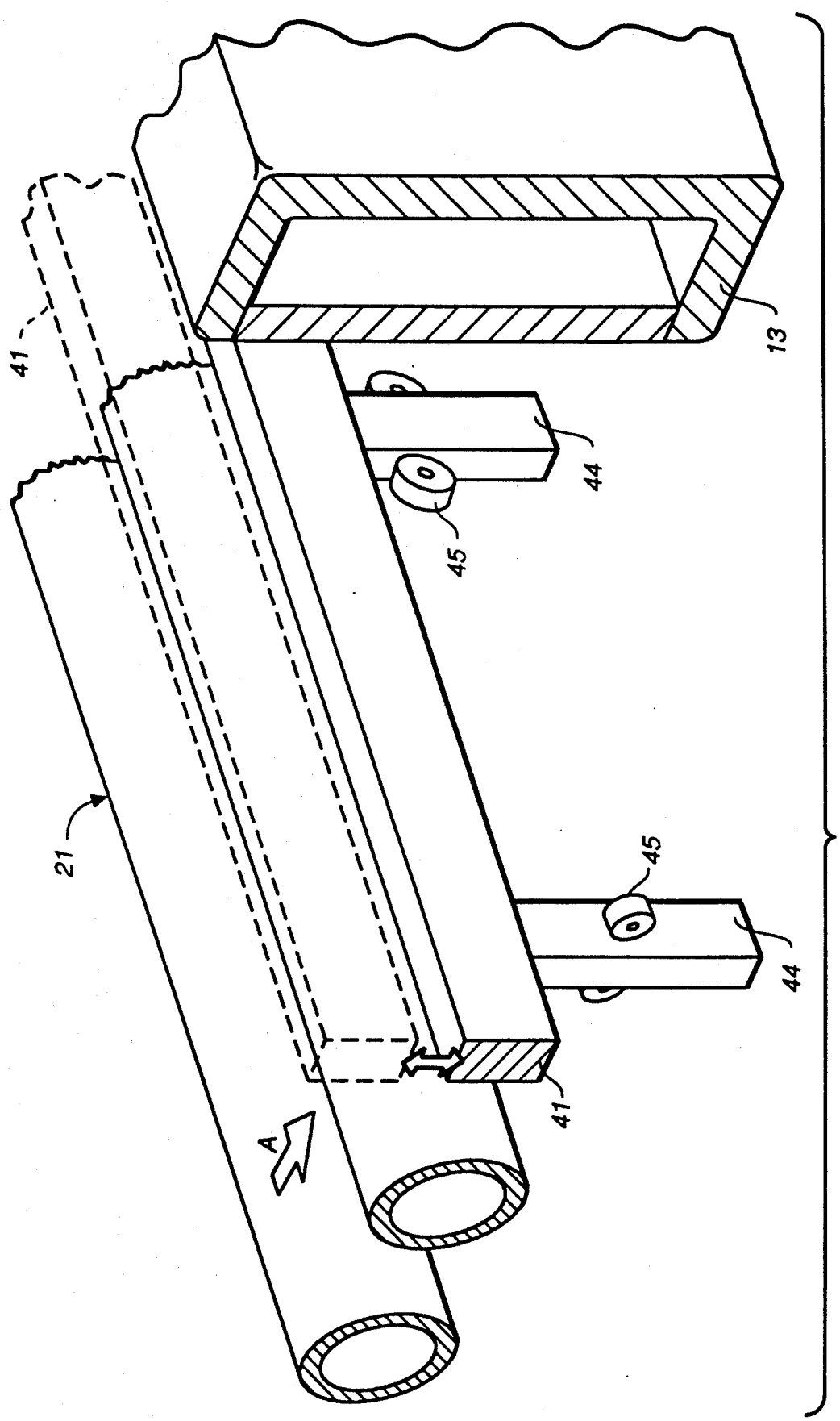
FIG._3

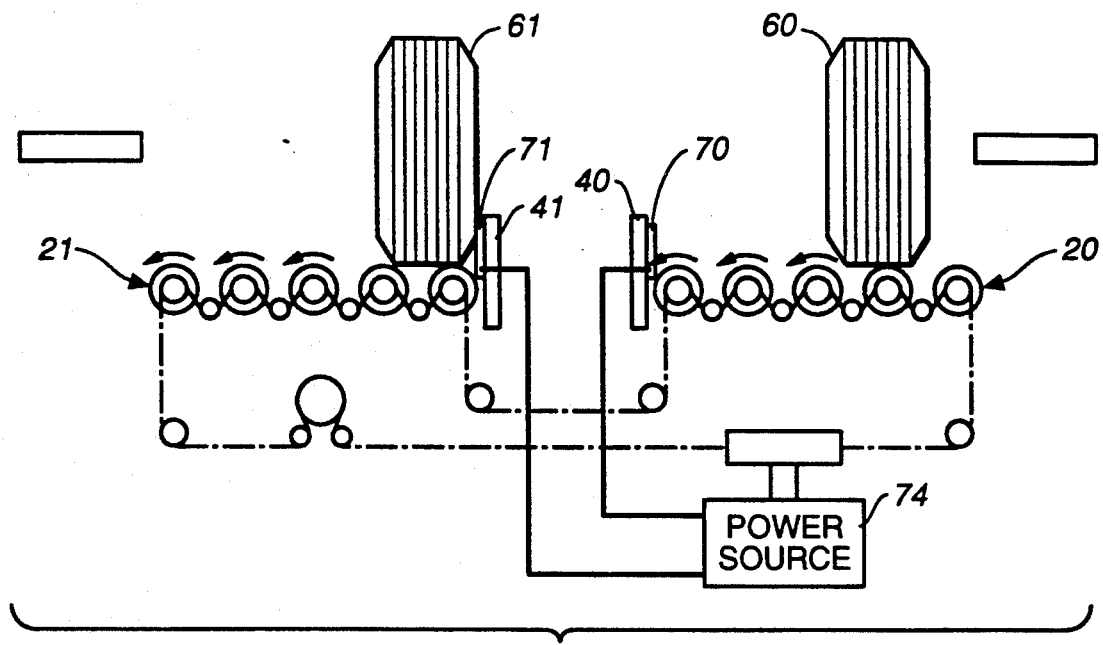
FIG._5
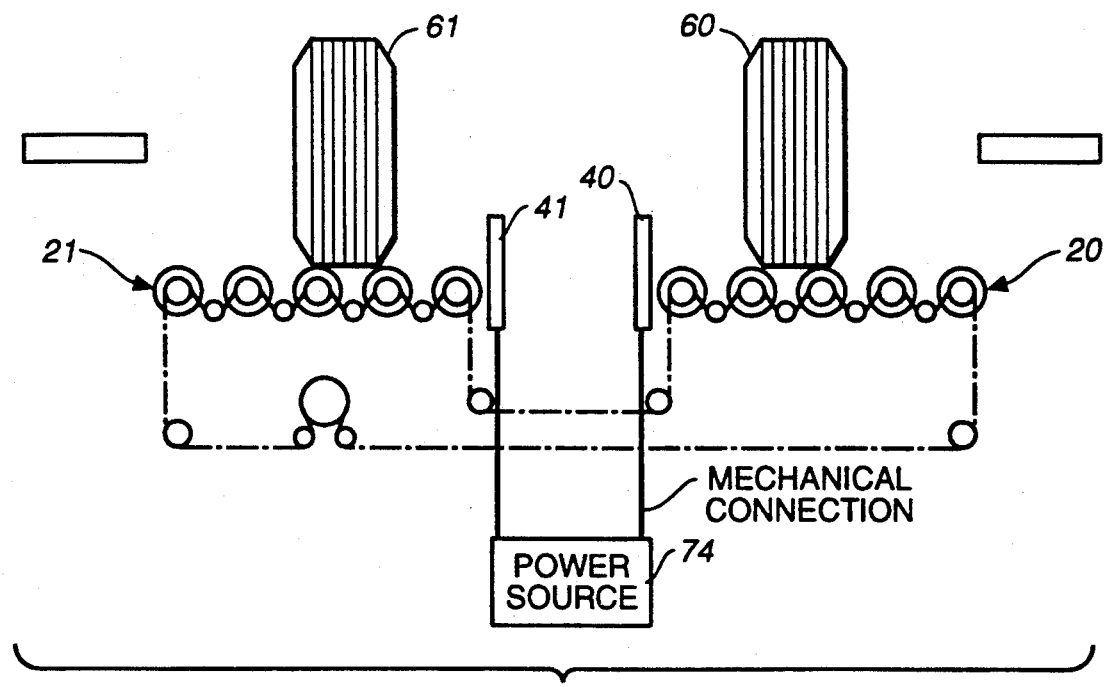
FIG._6

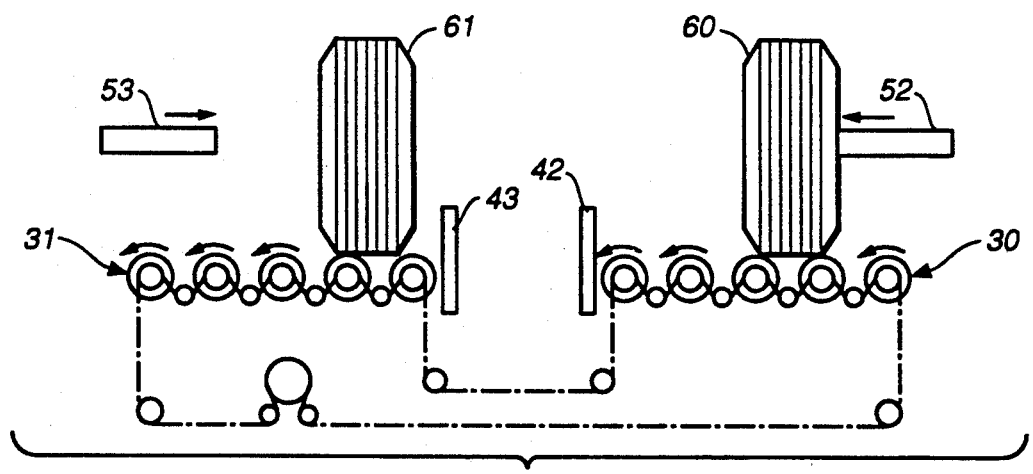
FIG._7
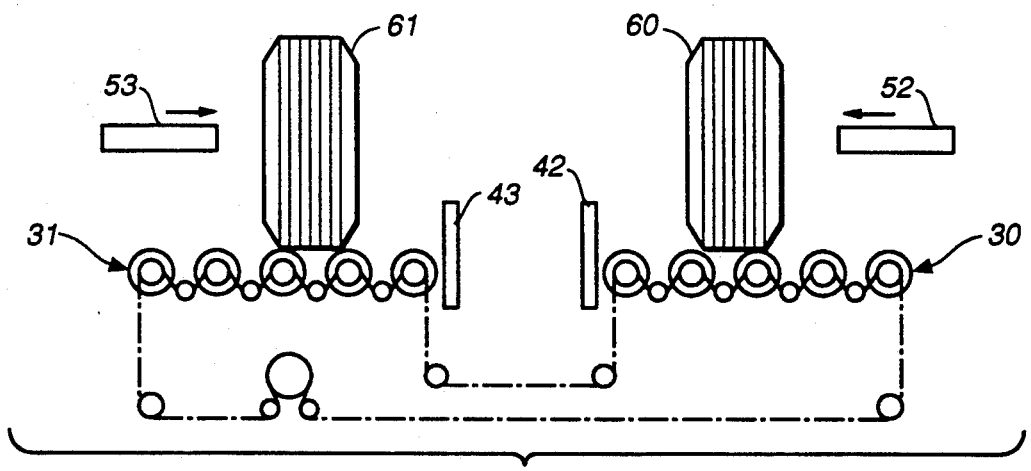
FIG._8
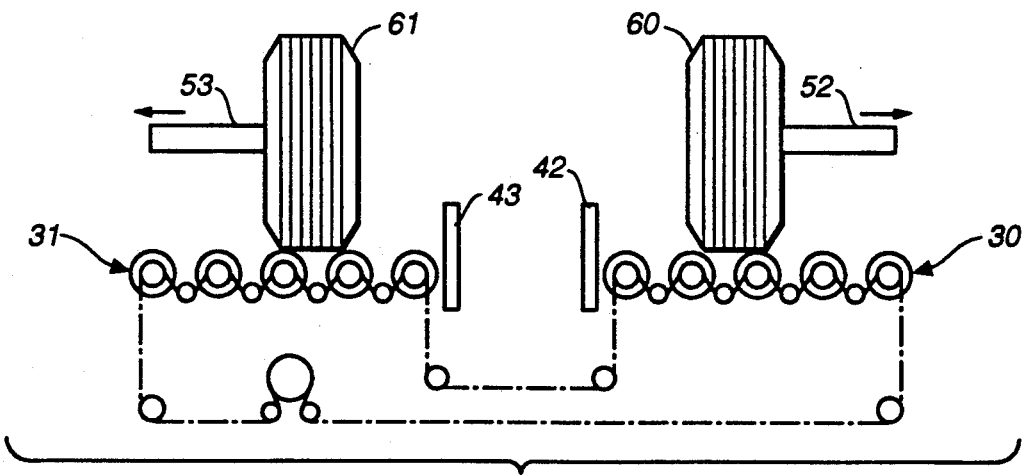
FIG._9

PARKING GARAGE VEHICLE TURN-TABLE

FIELD OF THE INVENTION

The present invention relates generally to the field of vehicle turn-tables used in multi-story parking garages. More specifically, the invention relates to turn-table devices capable of automatically arranging the position of a vehicle at the entrance and exit of the multi-story parking garage.

BACKGROUND OF THE INVENTION

Generally, vehicle turn-tables are comprised of a rotatable disk plate which is positioned in front of the entrance and exit of a multi-story parking garage.

To prevent accidents, (e.g., contact between the car and the garage) the vehicle must be moved onto a fixed position on the turn-table. Vehicle positioning is generally carried out by the driver. Accordingly, such positioning requires driving experience and skill without which the vehicle is liable to be inaccurately positioned, e.g., center line of the vehicle is moved onto the turn-table not perpendicular or parallel to the center line of the turn-table. Therefore, guide lines are generally provided on the turn-table to aid the driver in the positioning of the vehicle. The guide lines are designed so that they are wide enough to accommodate different types of vehicles which have different wheel bases and/or different wheel widths. However, the need to accommodate different size vehicles presents a margin for driver error and prevents the driver from accurately positioning the wheels, even though the vehicle is driven generally within the guide lines. Accordingly, the vehicle may be inaccurately positioned, which in turn can cause the vehicle to not be secured in its position. Moreover, the movement of rubber tires contacting and turning on the guide lines can produce an undesirable frictional sound.

Earlier applications of the present inventor directed to vehicle conveyers for multi-story parking garages are described in Japanese Patent Application No. 1-53900, U.S. patent application Ser. No. 07/462,176, filed Jan. 8, 1990, now U.S. Pat. No. 5,012,745 and U.S. Ser. No. 07/511,418, filed Apr. 20, 1990, now U.S. Pat. No. 5,037,263. These applications disclose devices capable of conveying a vehicle between the entrance and exit and parking space of a multi-story parking garage. In such automated garages, cars are moved using a shifter which moves on tracks and which includes catcher arms which move and carry each of the wheels. The turn-table of the present invention could be used in combination with such multi-story parking garages.

SUMMARY OF THE INVENTION

The invention is comprised of a rotatable vehicle turntable device which can be used in connection with a multi-story parking garage. The turntable is comprised of a substantially circular disk-shaped frame which frame has positioned thereon and extruding upwardly from its surface four sets of wheel fixing rollers which rollers are spatially positioned on the surface of the disk so as to accommodate the special positions of the wheels of a vehicle. Positioned inwardly (toward the center of the disc) from each of the rollers is a guard plate which protrudes upwardly from the surface of the disk to a height sufficient to prevent movement of vehicles wheels thereover. The guard plates and individual rollers within the roller sets are positioned substantially parallel to each other. A movable side plate is positioned alongside and outwardly (away from the center of the disc) of each of the sets of rollers. The side plates extend upwardly from the surface of the disk to a height sufficient to block the movement of the wheels. Further, the side plates are mechanically connected to a power source such that they can be moved against the side of the wheel and force the wheel vehicle toward the guard plate on the opposite side of the rollers. Each of the guard plates is preferably equipped with an electrical contact sensor. The rollers are also connected to a power source. The contact sensors are preferably interconnected with a computerized system for evaluating the position of the vehicle wheels on the rollers and after evaluating such sending signals to the power sources to move the rollers and/or side plates and position the wheels of the vehicle securely in the center of the turntable.

It is a primary object of the present invention to provide a vehicle turn-table which readily accommodates various vehicle sizes.

Yet another object of the present invention is to provide such a vehicle turn-table which is for a multi-story parking garage equipped with an automatic vehicle conveying system.

An advantage of the present vehicle turn-table is that it has a simple sturdy structure.

A feature of the present invention is that is can be safely and easily used by drivers with little driving skill and experience.

Another advantage of the present invention is that it allows vehicles to be quickly and safely positioned in the center of the turntable for quick movement into the parking garage which the turntable is used in connection with.

These and other objects, advantages and features of the present vehicle turntable device will become apparent to the person skilled in the art upon reading the details of the structure and operation of the turntable, reference being made to the accompanying drawings forming a part hereof.

BRIEF DESCRIPTION OF THE DRAWINGS

This invention may be better understood and its numerous objects, advantages and features will become apparent to those skilled in the art by reference to the accompanying drawings as follows:

FIG. 1 is a plan view of a vehicle turn-table of the present invention.

FIG. 2 is a sectional view of FIG. 1 taken from the line II—II.

FIG. 3 is a partial prospective cross-sectional view of a portion of one of the sets of wheel fixing rollers of the invention.

FIG. 4 is a sectional view of one of the side plates 51 positioned alongside of a tire.

FIG. 5 is a sectional view of tires positioned on the wheel fixing rollers with arrows showing the operating mechanism for the rollers.

FIG. 6 is a sectional view of tires positioned on the wheel fixing rollers after the tires have been moved to a centered position to keep vehicles from falling from the wheel fixing rollers.

FIG. 7 is a sectional view of the wheel fixing rollers with arrows showing the movement of the side plates and rollers.

FIG. 8 is a sectional view of the wheel fixing rollers with the tires being positioned by the side plates to a stop position.

FIG. 9 is a sectional view of the wheel fixing rollers with the tires in a fixed, centered and secure position.

DETAILED DESCRIPTION OF PREFERRED EMBODIMENTS

Before the structure and operation of the present turntable device is disclosed and described, it is to be understood that this invention is not limited to the particular components and methods of operation described, as such may, of course, vary. It is also to be understood that the terminology used herein is for purposes of describing particular embodiments only, and is not intended to be limiting since the scope of the present invention will be limited only by the appended claims.

It must be noted that, as used in this specification and appended claims, the singular forms "a," an, and "the" include plural referents unless the context clearly dictates otherwise. Thus, for example, reference to "a roller" includes a plurality of such rollers, reference to "the method of operation" includes a plurality of such methods which will become apparent to those skilled in the art upon reading this disclosure.

A generalized description of the structure and operation of the device can be given by reference to FIG. 1. A vehicle (not shown) enters the turntable 10 from the side having the tire guard 14 positioned thereon. The tire guard 14 is an angularly shaped protuberance on the outer circumference of the disk-shaped table 10 which is positioned and angled in such a manner such that if a tire presses against its edge, the tire will be angled away toward the sets of rollers on the table. The car moves in the direction of the arrow B shown in FIG. 1. Four sets of wheel fixing rollers 20, 21, 30 and 31 are spatially positioned on the surface of the table 10 in a manner so as to protrude upwardly from the surface of the disk and positioned spatially so as to correspond generally with the spacial position of tires on a conventional vehicle. When the tires of the vehicle are first moved onto the wheel fixing rollers, the vehicle may not be precisely positioned so that its center matches the center line L of the table. However, the operation of the wheel fixing rollers in combination with movable side plates 50, 51, 52 and 53 can position the vehicle in the center of the table in a secure position. The guard plates 40, 41, 42 and 43 are positioned alongside the wheel-fixing rollers and protrude upwardly from the surface of the table 10 to an extent so as to block the movement of a car wheel thereover. Accordingly, the wheels are positioned between the side plates and the guard plates on the wheel-fixing rollers. The wheel-fixing rollers and side plates are movable so as to precisely position and center the vehicle. The table itself is rotatable so that the direction of the vehicle, once fixed, can be turned to any degree required. The table is preferably turned by a computer controlled power source so that the rails 12 and 13 are aligned with similar rails in a parking garage.

FIG. 1 illustrates a plan view and FIG. 2 illustrates a sectional view of a vehicle turn-table of the present invention. The vehicle turn-table is comprised of a table 10, a first pair of wheel fixing rollers 20 and 21, a second pair of wheel fixing rollers 30 and 31, side plates which act as a means for preventing a vehicle from falling from the rollers, which means prevents tires from moving off of the fixing wheel rollers, and a stop position arranging system which includes guard plates with sensors which detect the position of a vehicle soon after it is moved onto the table 10.

TABLE

As shown in FIG. 1, the table 10 is a rotatable disk in the shape of a circular frame. The disk 10 can pivot 360° about an axis 11. A pair of parallel or substantially parallel rails 12 and 13 are provided on opposite sides of the center of the table 10. The rails 12 and 13 allow for the movement of a vehicle conveyor (not shown) which is used to move vehicles in the parking garage (not shown). Four spaces are provided outside the rails 12 and 13 on the table 10 and wheel fixing rollers 20, 21, 30 and 31 are provided in each of the four spaces. A tire guard 14 is connected to or integral with the outer circular circumference of the table 10 which aids in driving a vehicle onto the table. A gate 15 for a multistory parking garage is shown at the top of FIG. 1. A vehicle could be rotated to a position to enter the gate 15.

WHEEL FIXING ROLLER

Each of the wheel fixing rollers 20, 21, 30 and 31 are sets of rollers comprised of a plurality of individual rollers which are arranged parallel to each other at regular intervals. In general, the wheel base and tire width differ somewhat from vehicle to vehicle, so that the number of individual rollers and the length and position of the rollers 20, 21, 30 and 31 should be arranged so that they can accommodate a range of different vehicles. The individual rollers (preferably five rollers per set) of the respective rollers 20, 21, 30 and 31 are designed so that they can be rotated by a motor 74 which are in mechanical connection with the rollers via gears, chains or other suitable means (see the chain connections in FIGS. 5-9).

MEANS FOR SECURING VEHICLES IN POSITION

Referring to FIGS. 1 and 2 allows for an explanation of how the invention prevents the wheels of a vehicle from falling from the wheel fixing rollers while positioning the wheel in the right position on the table 10. The means for preventing movement are comprised of guard plates 40, 41, 42 and 43 which prevent a vehicle from falling. The guard plates can also be in pairs, e.g., 40 and 42 connected as one plate and 41 and 43 connected as one plate. The guard plates include electric sensors 70, 71, 72 and 73 which detect any contact between the guard plate and the wheels. The guard plates 40-43 are preferably comprised of steel materials or other suitable material capable of holding the pressure of the wheels. The guard plates 40-43 should be provided between the rails 12 and 13 and the rollers 20, 21, 30 and 31. The 20 plates 40-43 may be fixed but are preferably mechanically interconnected so as to make it possible to raise and lower them manually or automatically. When movable, the guard plates 40 and 41 may operate together and 42 and 43 may operate together. When a tire contacts either the plates 40 or 41, a sensor on the plate detects the contact and sends a signal to the driving gear or other power conveyor means of the rollers 20 and 21 to turn the individual rollers in the appropriate direction so as to move the vehicle to the correct position. When a tire contacts either the plates 42 or 43, the sensor detects the contact and sends a signal to the appropriate driving gear which is conveyed to the rollers 30 and 31 in order to turn the individual rollers in the appropriate direction and move the vehicle to the correct position. The sensor detection and roller movement signals should be controlled by a computer to safely and rapidly position the vehicle.

FIG. 3 shows support bars 44 connected under the guard plate 41 at regular intervals. Raising rollers 45 are provided around the support bars 44. The rollers 45 press firmly against the plates 44 so that when the rollers 45 are turned (by a power source not shown), they send the guard plate 41 upward. Sensors (not shown) should be provided on the guard plates. When the tire of a vehicle contacts the guard plate 41 after the guard plate 41 is raised (through their connection with the support bars 44 and the raising rollers 45), the guard plate 41 should be capable of holding the pressure of the vehicle without causing physical distortion in their shape and the sensors should continue to detect the pressure. Each of the guard plates 40, 42 and 43 have the same shape function and operation as the guard plate 41. The guard plates 40–43 may be designed as protruding guides above the wheel fixing rollers 20, 21, 30 and 31 and may be designed without the rising and descending function.

STOP POSITION ARRANGING SYSTEM

Referring to FIG. 4, the side plate 51 of the stop position arranging system can be seen. The system can secure a vehicle in a stationary position. A signal from the system should be sent to the driving gears of the respective wheel fixing rollers 20, 21, 30 and 31. By interpreting the signals, the vehicle can be moved onto the desired position by the turning of the rollers 20, 21, 30 and 31. The stop position arranging system is comprised of a first pair of side plates 50 and 51, a second pair of side plates 52 and 53, making it possible to secure the position of the wheels of the vehicle.

As shown in FIG. 4, brackets 55 are provided on both sides of the body 54 of the side plate 51 in the form of protrusions. A bar 57, which is longer than the diameter of a wheel, extends the length of the body 54. Both sides of the bar 57 should be connected to the brackets 55 with standing shafts 58. The respective brackets 55 have two vertical holes through which the standing shafts 58 should be provided. Springs 59 are provided around the respective standing shafts between two vertical holes. The springs 59 form an actuator for electrical switches which are provided on both sides of the body 54 to electrically detect contact and the amount of pressure from a vehicle on the bar 57. After detecting the contact and amount of pressure, the sensors (not shown) send signals. The side plates 50, 52 and 53 each have the same structure, function and operation as the side plate 51. The side plates 50 and 51 operate as a pair and the side plates 52 and 53 operate as a pair. The driving gear of the wheel fixing rollers 20 and 21 operates in response to signals from the side plates 50 and 51. The driving gear of the wheel fixing rollers 30 and 31 operates in response to signals from the side plates 52 and 53. Accordingly, all the rollers are controlled. Each of the pairs of side plates (50, 51, 52 and 53) are placed outside and above the wheel fixing rollers at regular intervals from the center line L (see FIG. 1) of the table 10. Each of the pairs of side plates may shift in the direction of the center line L at the same speed. It is very important for the side plates to be parallel to the center line L. The respective pairs of side plates 50–53 shift at the same speed until the pairs of side plates touch both sides of the wheels at the same time after contact movement is halted. If the side plate 50 touches a wheel earlier than the side plate 51, the sensors detect it. Accordingly, a signal will be sent from the sensors to the drive gear of the wheel fixing rollers 20 and 21. The wheel fixing rollers 20 and 21 are controlled to turn in the opposite direction from the side plate 50. If the side plate 51 touches a wheel earlier than the side plate 50, the wheel fixing rollers 20 and 21 are controlled in a manner so as to operate in the opposite direction described above. The side plates 52 and 53 and the wheel fixing rollers 30 and 31 operate as per elements 50, 51, 20 and 21. Shifting speed of the side plates 50–53 and speed of revolution of the wheel fixing rollers 20, 21, 30 and 31 should be almost the same. Note that some rollers can be adjusted to operate faster to some degree. The stop position arranging system with the wheel fixing rollers 20, 21 30 and 31 should be controlled by a computer.

OPERATION

Driving a Vehicle onto the Table

As shown in FIG. 1, a table 10 includes guard plates 40–43 provided thereon and protruding upwardly from the planar surface of the table. A driver first drives a vehicle onto the table and attempts to center the vehicle relative to the center line L of the table, while moving in the direction of an arrow B. Once driven onto the table 10, the vehicle should be stopped and its parking brake should be applied. The vehicle should then be positioned with the front wheels on wheel fixing rollers 20 and 21 and rear wheels on wheel fixing rollers 30 and 31. As shown in FIG. 4, if a rear wheel 61 moves in the wrong direction on the wheel fixing rollers 21, the guard plate 41 will prevent the wheel from falling from the rollers. Furthermore, when a sensor on the guard plate 41 detects contact with the rear wheel, the wheel fixing rollers 20 and 21 begin to rotate in order to adjust the position of the vehicle. The adjustment is carried out so that the rear wheels 60 and 61 on the wheel fixing rollers are moved into the position shown in FIG. 6. Horizontal movement of the vehicle is generally limited to less than 15 cm, more preferably less than 5 cm. When the other wheels contact the guard plates, the wheel fixing rollers are activated and arrange the opposition of the vehicle in the same manner described above. These limited movements are carried out in order to prevent the vehicle from slipping off of the rollers and not for arranging the vehicle onto the center line L of the table 10.

Arranging Position of a Vehicle

After a driver gets out of a vehicle, the respective side plates 50–53 in FIG. 1 shift inward simultaneously, e.g., as shown by the direction arrows in FIG. 7. When the rear wheels 60 and 61 are on the right side of the table, the side plate 52 shifts inwardly toward the wheel until it contacts the rear wheel 60. When sensor on the side plate 52 detects contact with the rear wheel, the wheel fixing rollers 30 and 31 rotate (based on the signal received from the sensor) to convey the vehicle to the correct position. As shown in FIG. 8, the wheel fixing rollers 30 an 31 rotate to arrange the position of the rear wheels 60 and 61.

As shown in FIG. 9, the side plates 52 and 53 are shifted and the fixing rollers 30 and 31 are rotated until the side plates 52 and 53 contact the rear wheels 60 and 61 at the same time. After the side plates 52 and 53 contact rear wheels 60 and 61, the side plates stop shifting and return to their ready position.

The rear wheels and the front wheels are arranged in the same or substantially the same manner. The above operation may be carried out when the table 10 is stationary or while rotating toward alignment with the gate 15. During the rotation of the table 10, the guard plates 40-43 shift down.

The vehicle turn-table of the present invention does not necessarily include a means capable of arranging the final stop position of the vehicle. Therefore, sensors or other devices for arranging the final stop position may operate in conjunction with the table.

Entering the Parking Garage

The gate 15 shown in FIG. 1 opens and the vehicle on the table 10 can be moved into the parking garage under its own power or preferably using a conveyer the type described in U.S. patent application Ser. No. 07/462,176, filed Jan. 8, 1990, now U.S. Pat. No. 5,012,745 and/or Ser. No. 07/511,418, filed Apr. 20, 1990, now U.S. Pat No. 5,037,262 the disclosures of which are incorporated herein by reference, or other suitable means. The conveyor moves on the rails 12 and 13 which rails are aligned with rails in the parking garage.

EFFECT

The wheel fixing rollers rotate after a vehicle is moved onto the table allowing drivers of even limited driving experience and skill a method of placing a vehicle in the right position on the table.

The guard plates prevent a vehicle from falling from the rollers and the rollers convey the vehicle to the right position.

A vehicle can be easily driven onto the right position, thus avoiding the need for repeated driving attempts to arrange the position of the vehicle.

The present invention is shown and described herein in what is considered to be the most practical and preferred embodiments. It is recognized, however, that departures may be made therefrom which are within the scope of the invention and that obvious modifications in the components and their arrangement and operation will occur to those skilled in the art upon reading this disclosure.

What we claim is:

1. A vehicle turn-table device for use in connection with a multi-story parking garage, comprising:
    a substantially circular framed platform;
    four sets of wheel fixing rollers positioned on the circular framed platform as a first pair and a second pair of rollers, the sets of rollers being positioned spatially so as to match spatial positioning of four wheels of a vehicle;
    a first guard plate positioned alongside of and extending substantially parallel to the first pair of wheel fixing rollers;
    a second guard plate positioned alongside of and extending substantially parallel to the second pair of wheel fixing rollers;
    contact sensors positioned on each of the guard plates;
    four movable side plates substantially parallel to the four sets of wheel fixing rollers and movably positioned alongside the fixing rollers on a side of the fixing rollers opposite from the guard plates;
    an electrical system connecting the contact sensors with a mechanical power source; and
    a power transfer means connecting the power source with the four sets of wheel fixing rollers and four movable side plates.

2. The vehicle turn-table device as claimed in claim 1, wherein the first guard plate substantially parallel to the first pair of fixing rollers is comprised of a front guard plate and a rear guard plate.

3. The vehicle turn-table device as claimed in claim 2, wherein the second guard plate substantially parallel to the second pair of fixing rollers is comprised of a front guard plate and a rear guard plate.

4. The vehicle turn-table device as claimed in claim 1, wherein both the first and the second guard plates are comprised of a front guard plate and a rear guard plate providing a total of four guard plates each positioned alongside one of the four sets of wheel-fixing rollers.

5. The vehicle turn-table device as claimed in claim 4, where each of the four guard plates is movably connected to a power transfer means and a power source allowing the guard plates to be moved upwardly out of the plane of the circular framed platform or downwardly so that the guard plates do not protrude beyond a plane of the platform.

6. The vehicle turn-table device as claimed in claim 1, wherein the four sets of wheel-fixing rollers each include a plurality of rollers which are connected to a chain which can serves as a power source capable of moving the rollers while a vehicle tire is positioned thereon.

7. The vehicle turn-table device as claimed in claim 1, further comprising:
    a tire guard in the form of a trapezoidalshape protuberance extending outwardly from the circumference of the circular-framed platform, the protuberance having angularly-shaped edges portioned so as to deflect vehicle tires contacting therewith toward the sets of wheel fixing rollers on the framed platform.

8. The turn-table device as claimed in claim 1, further comprising:
    a first elongated metal track positioned along side of, inwardly from and extending parallel to the first guard plate; and
    a second elongated metal track positioned along side of, inwardly from the extending substantially parallel to a second guard plate.

9. The vehicle turn-table device as claimed in claim 1, wherein each of the sets of wheel fixing rollers is comprised of five individual rollers.

10. A vehicle turn-table device, comprising:
    a substantially circular framed disc-shaped platform;
    four sets of wheel fixing rollers on the platform spatially positioned with respect to each other so as to match spatial positioning of vehicle wheels;
    four guard plates positioned along side of and substantially parallel to each of the four sets of wheel fixing rollers;
    contact sensors positioned on each of the four guard plates;
    four side plates which plates are horizontally moveable with respect to a surface of the platform, the side plates being positioned substantially parallel with respect to the guard plates and spatially positioned along side of the sets of wheel fixing rollers outwardly from the rollers relative to the center of the platform;

an electrical system connecting the contact sensors with a mechanical power source; and a power transfer means connecting the power source with the four sets of wheel fixing rollers and the four horizontally moveable side plates.

11. The vehicle turn-table device as claimed in claim 10, wherein the four guard plates are moveable vertically relative to the surface of the platform, the guard plates being connected to a power transfer means and the power source.

12. The vehicle turn-table device as claimed in claim 11, further comprising a pair of metal tracks extending substantially parallel to the guard plates and being positioned inwardly from the guard plates relative to the center of the platform.

* * * * *